(12) United States Patent
Elnozahy et al.

(10) Patent No.: US 7,953,854 B2
(45) Date of Patent: May 31, 2011

(54) APPARATUS AND METHOD FOR PROVIDING REMOTE ACCESS REDIRECT CAPABILITY IN A CHANNEL ADAPTER OF A SYSTEM AREA NETWORK

(75) Inventors: Elmootazbellah Nabil Elnozahy, Austin, TX (US); Peter Anthony Walker, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/174,746

(22) Filed: Jul. 17, 2008

(65) Prior Publication Data

US 2008/0270726 A1 Oct. 30, 2008

Related U.S. Application Data

(62) Division of application No. 11/034,557, filed on Jan. 13, 2005, now Pat. No. 7,509,419.

(51) Int. Cl.
*G06F 15/173* (2006.01)
(52) U.S. Cl. ........ 709/225; 709/203; 709/217; 709/223; 709/228; 709/229
(58) Field of Classification Search .................. 709/203, 709/217, 223, 225, 228, 229
See application file for complete search history.

(56) References Cited

U.S. PATENT DOCUMENTS

| 5,313,646 | A | * | 5/1994 | Hendricks et al. ..................... 1/1 |
| 5,537,548 | A | * | 7/1996 | Fin et al. ....................... 709/204 |
| 5,812,774 | A | * | 9/1998 | Kempf et al. ................. 709/212 |
| 6,029,151 | A | * | 2/2000 | Nikander ........................ 705/39 |
| 6,246,678 | B1 | * | 6/2001 | Erb et al. ....................... 370/352 |
| 6,766,414 | B2 | * | 7/2004 | Francis et al. ................ 711/113 |
| 6,971,018 | B1 | * | 11/2005 | Witt et al. ..................... 713/187 |
| 7,043,002 | B2 | * | 5/2006 | Delaney et al. ............... 379/229 |
| 7,356,679 | B1 | * | 4/2008 | Le et al. ............................ 713/1 |
| 2005/0138112 | A1 | * | 6/2005 | Sagar et al. ................... 709/203 |

* cited by examiner

*Primary Examiner* — Liangche A Wang
(74) *Attorney, Agent, or Firm* — Yee & Associates, P.C.; Libby Z. Toub

(57) ABSTRACT

A method and apparatus for providing remote access redirect in a host channel adapter of a system area network are provided. The apparatus and method provide a mechanism by which a host channel adapter, in response to receiving a marker message, places selected channel(s) of the host channel adapter in a remote access redirect (RAR) mode of operation. During the RAR mode of operation, memory access messages received by the host channel adapter that are destined for portions of an application memory space marked as being protected are converted to RAR receive messages and redirected to a queue pair associated with an operating system rather than the queue pair for the application. The operating system is responsible for serializing access to application memory pages outside of the host channel adapter. The mechanisms of the present invention may be used to perform a checkpoint data integrity operation.

16 Claims, 16 Drawing Sheets

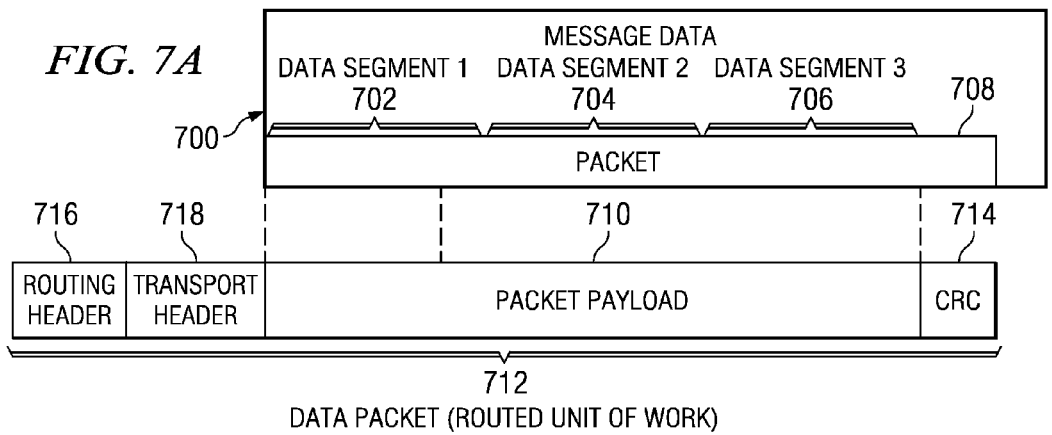
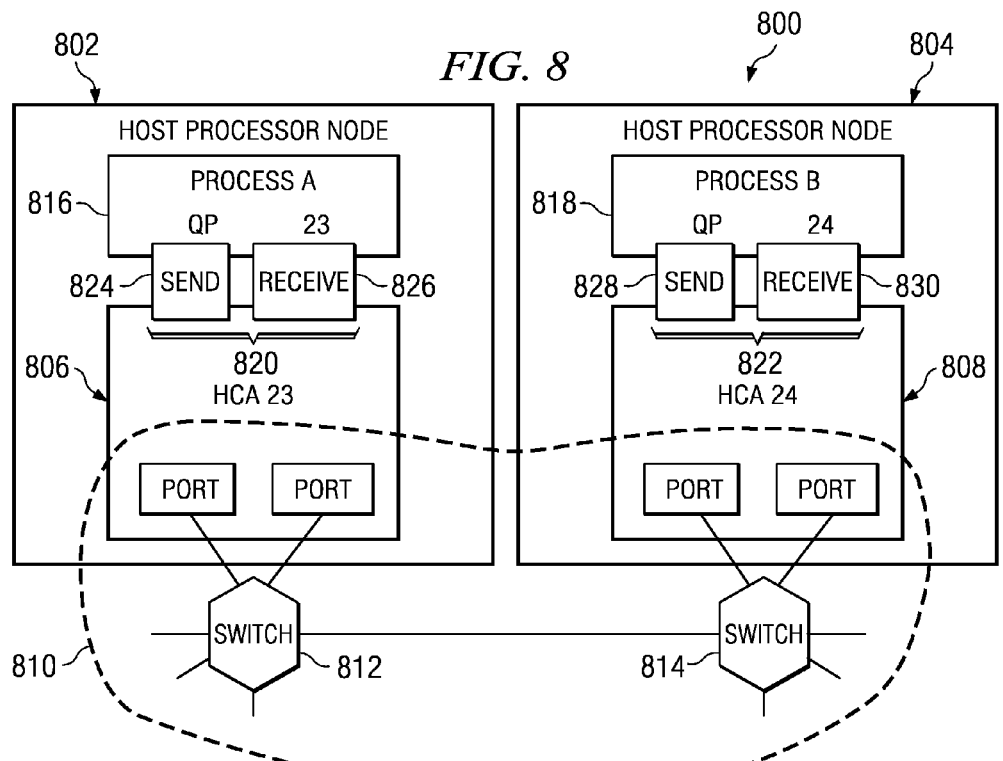

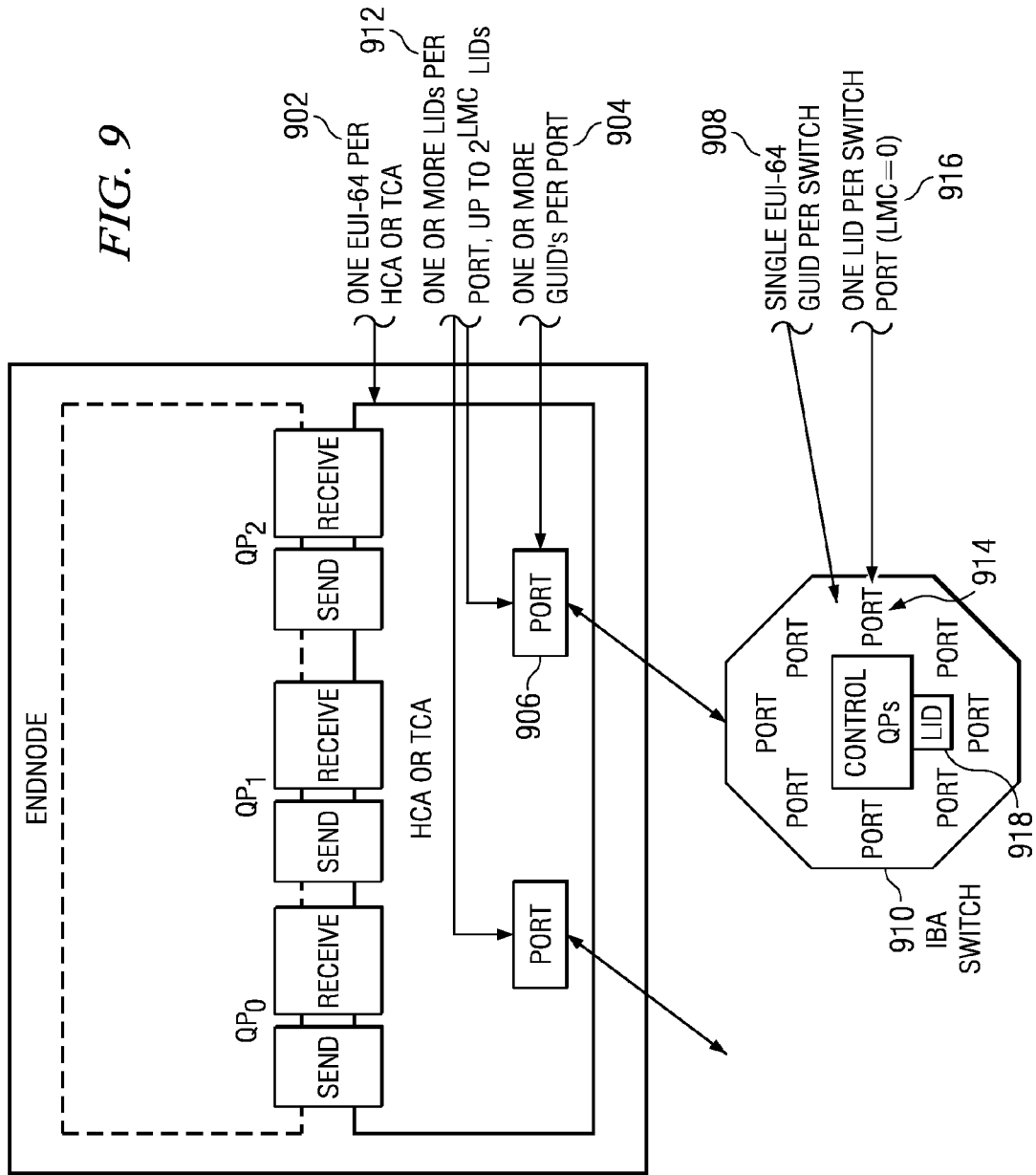

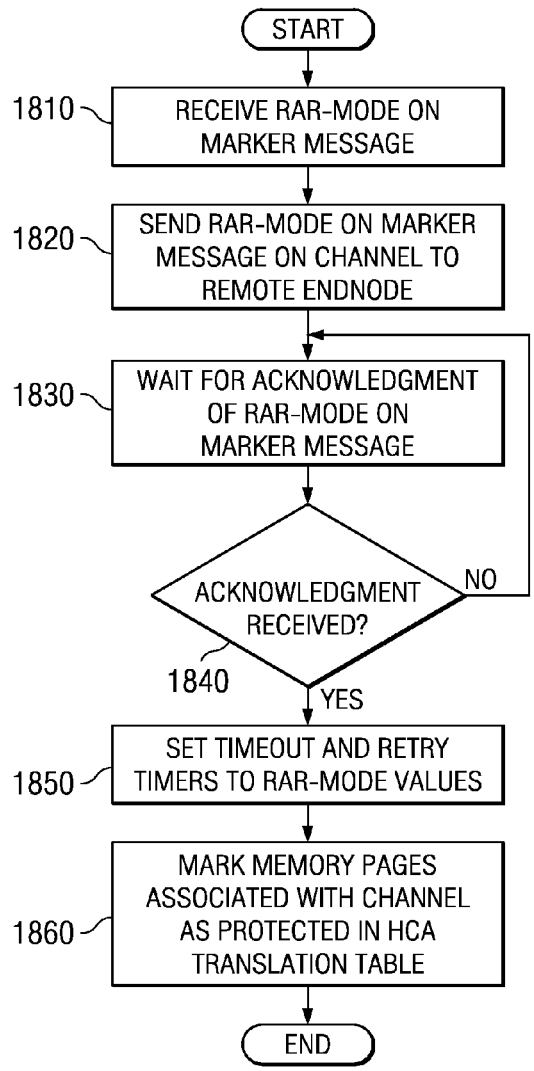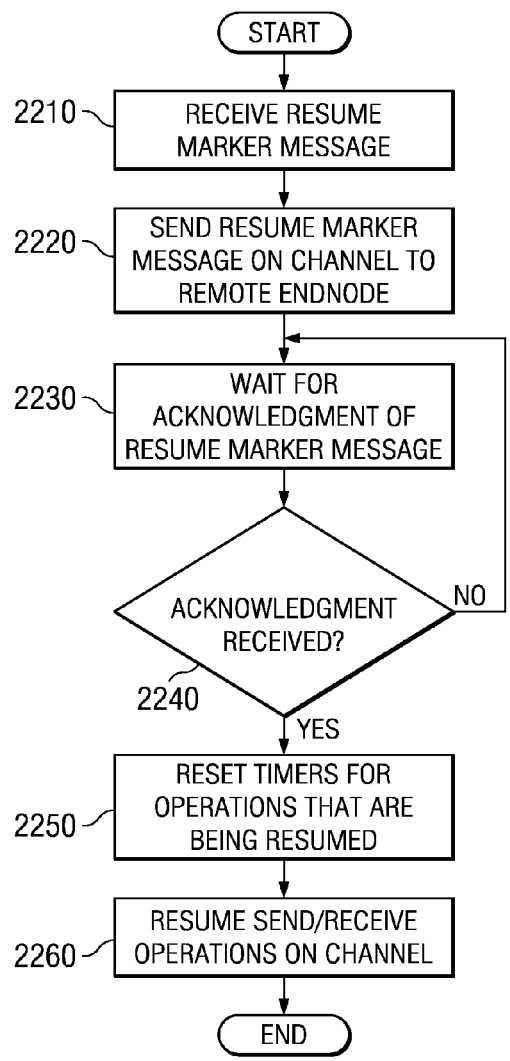

APPARATUS AND METHOD FOR PROVIDING REMOTE ACCESS REDIRECT CAPABILITY IN A CHANNEL ADAPTER OF A SYSTEM AREA NETWORK

This application is a divisional of application number Ser. No. 11/034,557, filed Jan. 13, 2005, status pending.

This invention was made with Government support under PERCS: Proj 950, NBCH30390004. THE GOVERNMENT HAS CERTAIN RIGHTS IN THIS INVENTION.

BACKGROUND OF THE INVENTION

1. Technical Field

The present invention is generally directed to an improved data processing system. More specifically, the present invention is directed to an apparatus and method for providing remote access redirect capability in a channel adapter of a system area network.

2. Description of Related Art

In a System Area Network (SAN), such as an InfiniBand (IB) network, the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

Thus, with the SAN architecture described above, an Ethernet device driver can communicate with an Ethernet adapter by posting send/receive messages to a Host Channel Adapter (HCA) and retrieve the results of these messages through the HCA's Send and Receive Work Queues. The Ethernet adapter includes a Target Channel Adapter, which is the component that attaches to the SAN. Thus, to attach to a Local Area Network (LAN), such as an Internet Protocol (IP) and Ethernet network, an Ethernet adapter is needed as well as a switch or router that attaches the Ethernet adapter to the IP based LAN.

In a SAN architecture, such as InfiniBand, reads and writes from/to an application's memory space are performed directly via the host channel adapters. Because of this, when data integrity operations must be performed on the application's memory space, there is a possibility that a read and/or write request pending in a host channel adapter may attempt to access a portion of the application's memory space that is being operated on by the data integrity operations. This may result in a loss of data integrity. That is, the actual state of the data in memory may not be as expected by the system. This is often referred to as a race condition and may lead to systemic problems or faults.

For example, assume that a portion of memory is being written to disk as part of a data integrity operation. If a host channel adapter has a pending write operation to this portion of memory, the write operation to this portion of memory may be performed simultaneously with the write operation of this portion of memory to disk. As a result, there is a mismatch between the data in the memory and the data in the copy of this portion of memory that is written to disk. Due to this mismatch, if a failure occurs requiring a rollback of the application's state, the correct state of the application may not be achievable since the copy of the portion of memory on disk does not include the write to the memory that occurred at the same time as the write to the disk nor does the operation log have the write operation listed after the time point of the write to disk. As a result, the write operation to the memory will not be replayed after rollback.

Therefore, it would be beneficial to have a system and method for ensuring the integrity of data during data integrity operations in a system area network.

SUMMARY OF THE INVENTION

The present invention provides an apparatus and method for providing remote access redirect in a host channel adapter of a system area network. The apparatus and method provide a mechanism by which a host channel adapter, in response to receiving a marker message, places selected channel(s) of the host channel adapter in a remote access redirect mode of operation. The marker message is a system area network immediate message that is interpreted by the host channel adapter. The marker message may be used to pause sending/receiving of message on a channel of the host channel adapter, resume sending/receiving of messages on the channel of the host channel adapter, turn on remote access redirect (RAR) mode of operation, and turn off the RAR mode of operation.

During the RAR mode of operation, memory access messages, e.g., reads/writes or atomic operations, received by the host channel adapter that are destined for portions of an application memory space marked as being protected, e.g., transient pages of memory that are being written to physical storage in a checkpoint operation, are converted to receive messages and redirected to a queue pair associated with an operating system rather than the queue pair for the application.

The operating system reads entries in this redirected queue pair and directs memory accesses to an appropriate copy of the application memory space, or the page in the application memory space to which the memory access operation was directed. The operating system is responsible for serializing access to application memory pages outside of the host channel adapter. Once the host channel adapter, or the channel within the host channel adapter, is removed from the RAR mode on operation, the operating system may update the translation tables of the host channel adapter to point to the copy of the application memory space. In this way, a mechanism is provided for redirecting memory accesses to the operating system for serialization during times in which memory accesses to an application memory space may result in a loss of data integrity.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7A is an illustration of a data packet in accordance with a preferred embodiment of the present invention;

FIG. 7B is an illustration of an exemplary base transport header in accordance with the present invention;

FIG. 8 is a diagram illustrating a portion of a distributed computer system in accordance with a preferred embodiment of the present invention;

FIG. 9 is a diagram illustrating the network addressing used in a distributed networking system in accordance with the present invention;

FIG. 18 is a flowchart outlining an exemplary operation of a host channel adapter when initiating a FAR-mode of operation in response to receiving a FAR-mode on marker message, in accordance with one exemplary embodiment of the present invention;

FIG. 22 is a flowchart outlining an exemplary operation of a host channel adapter when resuming sending/receiving of messages over a channel in accordance with one exemplary embodiment of the present invention.

DETAILED DESCRIPTION OF THE PREFERRED EMBODIMENTS

The present invention provides an apparatus, system and method for providing remote access redirect capability in a host channel adapter of a system area network (SAN) endnode. The preferred embodiments of the present invention will be described in terms of the InfiniBand architecture which is one possible system area network (SAN) in which the present invention may be used. Therefore, a description of the InfiniBand network will first be provided with regard to FIGS. 1-11. It should be appreciated, however, that the present invention is not limited to use with an InfiniBand network and any system area network (SAN) may be used to implement the mechanisms of the present invention without departing from the spirit and scope of the present invention.

Figure 1:
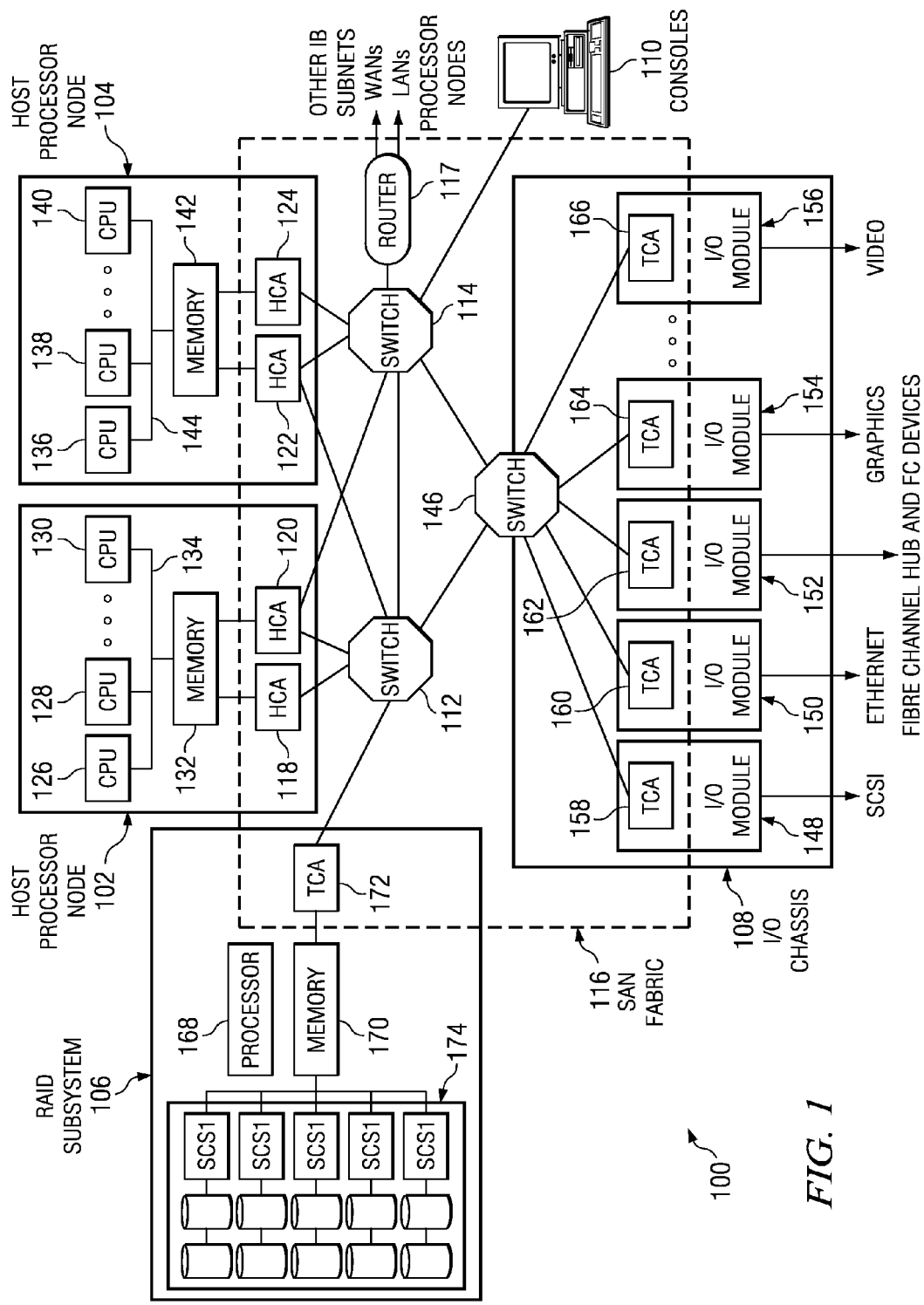
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by the Internet or an intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
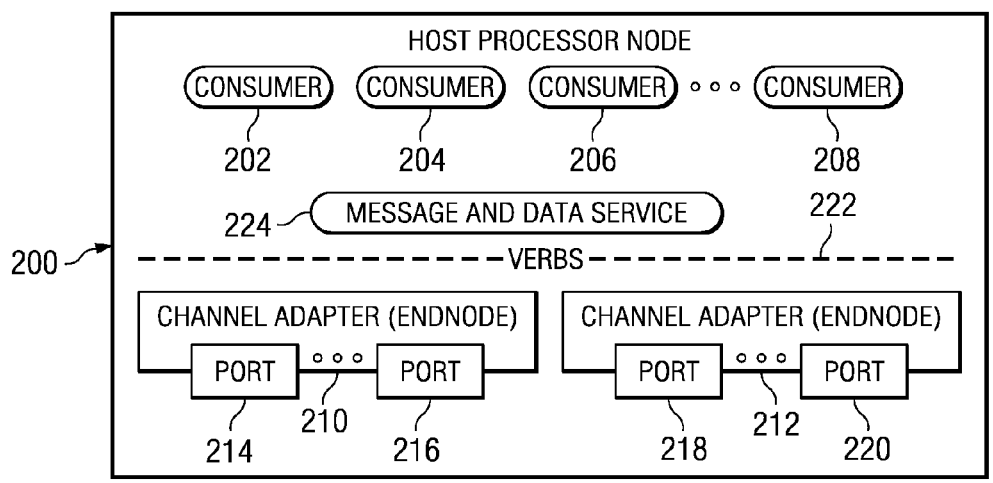
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

Figure 3A:
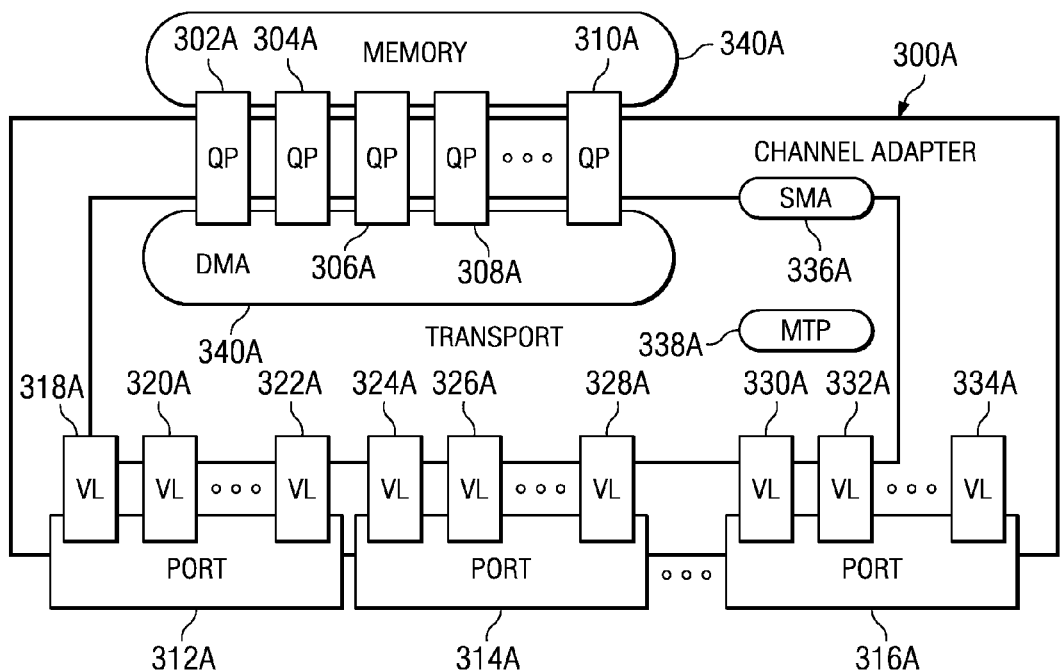
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A-310A, which are used to transfer messages to the host channel adapter ports 312A-316A. Buffering of data to host channel adapter ports 312A-316A is channeled through virtual lanes (VL) 318A-334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A-310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel and semantic messages. A consumer calls an operating-system specific programming interface, which is herein referred to as verbs, to place work requests (WRs) onto a work queue.

Figure 3B:
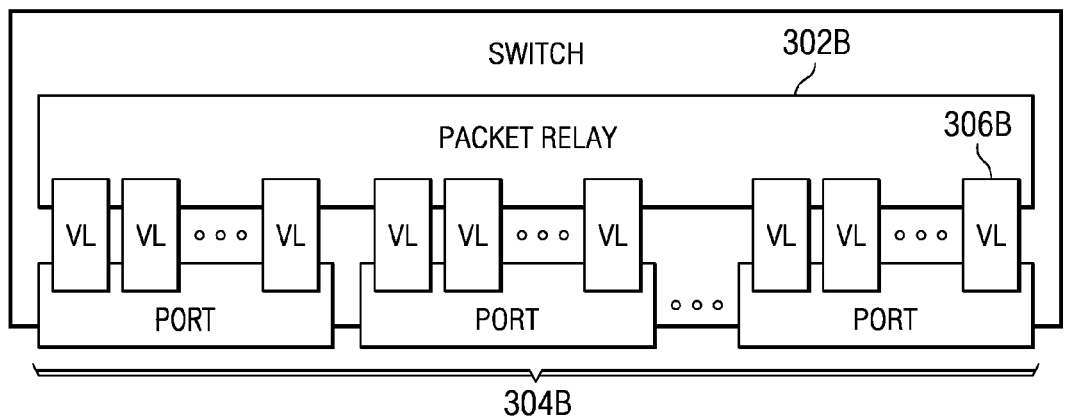
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
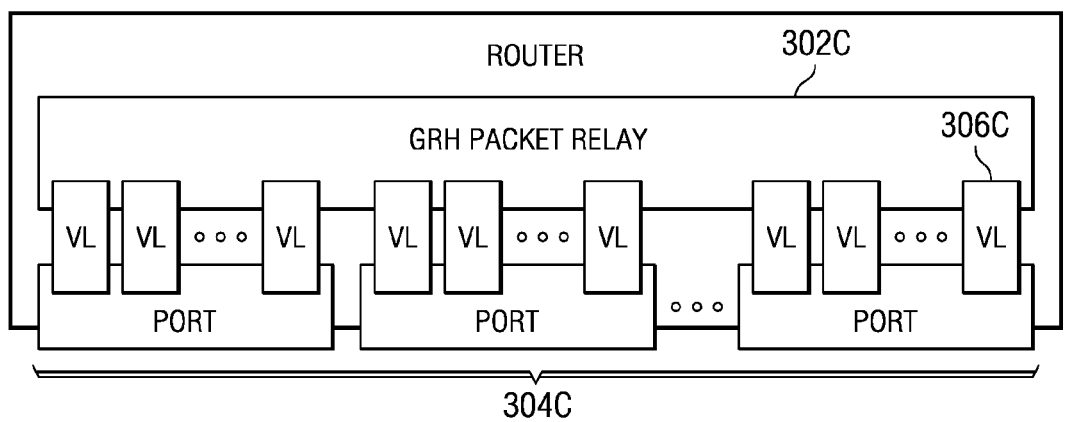
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
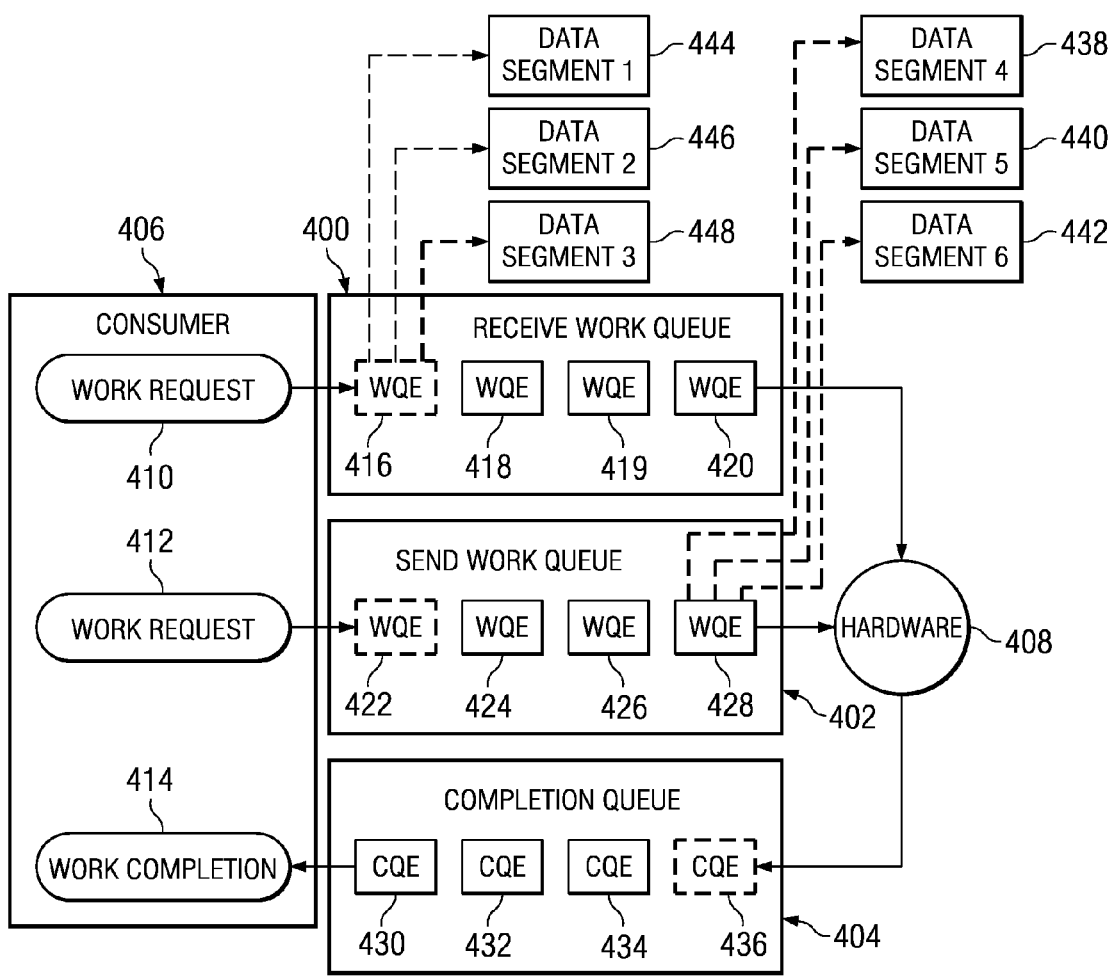
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
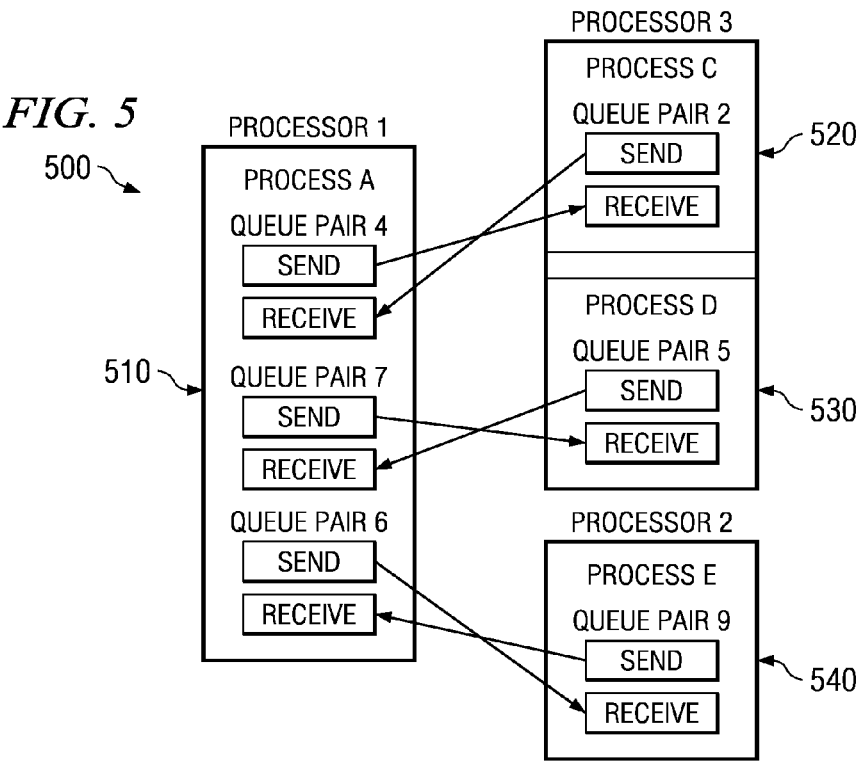
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, it each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

Figure 6:
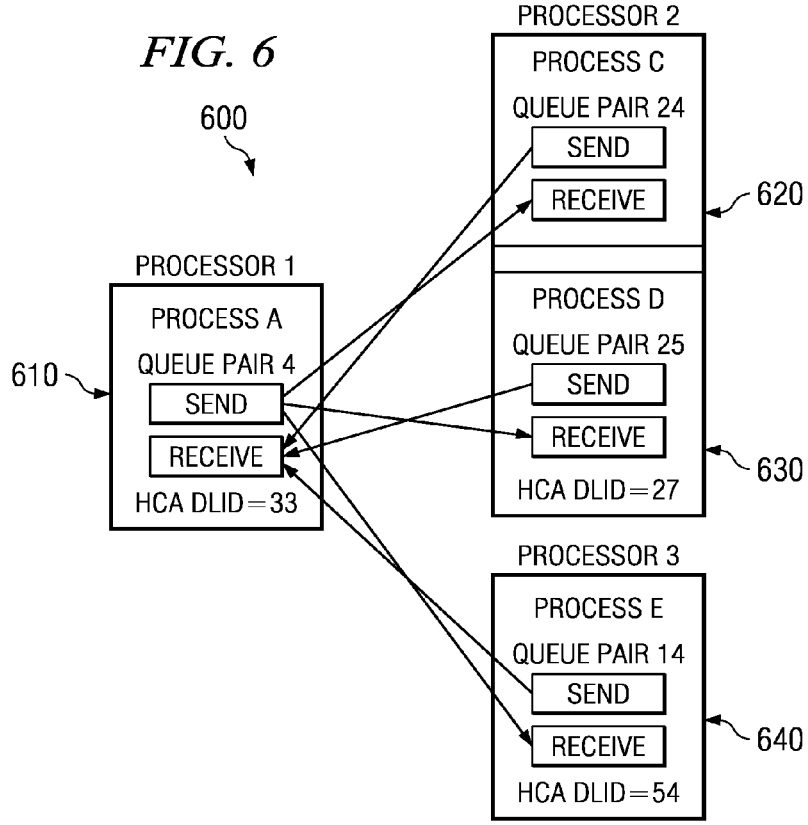
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Turning next to FIG. 7A, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

According to the InfiniBand specification, volume 1, section 5.2.3, the transport header 718 includes a base transport header (BTH) and optional datagram extended transport headers (DETHs) for reliable datagram messages. The BTH contains the fields for InfiniBand transports. FIG. 7B and the following table, Table 1, summarize the fields in the BTH. Of particular note to the present invention is the presence of the partition key (P_Key) which is used with the present invention, as described hereafter.

TABLE 1

| | | | |
|---|---|---|---|
| | | BTH Fields | |
| Field Name | Field Abbreviation | Field Size (in bits) | Description |
| Opcode | Opcode | 8 | This field indicates the IBA Packet Type. The OpCode also |

TABLE 1-continued

BTH Fields

| Field Name | Field Abbreviation | Field Size (in bits) | Description |
|---|---|---|---|
| | | | specifies which extension headers follow the BTH |
| Solicited Event | SE | 1 | This bit indicates that an event should be generated by the responder. |
| MigReq | M | 1 | This bit is used to communicate migration state. |
| Pad Count | PadCnt | 2 | This field indicates how many extra bytes are added to the payload to align to a 4 byte boundary. |
| Transport Header Version | TVer | 4 | This field indicates the version of the IBA Transport Headers |
| Partition Key | P_Key | 16 | This field indicates which logical partition is associated with this packet |
| Reserved (variant) | | 8 | Transmitted as 0, ignored on receive. This field is not included in the invariant CRC. |
| Destination QP | DestQP | 24 | This field indicates the WQP Number at the destination |
| Acknowledge Request | A | 1 | This bit is used to indicate that an acknowledge (for this packet) should be scheduled by the responder. |
| Reserved | | 7 | Transmitted as 0, ignored on receive. This field is included in the invariant CRC. |
| Packet Sequence Number | PSN | 24 | This field is used to detect a missing or duplicate packet |

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 906 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. Each switch 910 has one LID 918 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
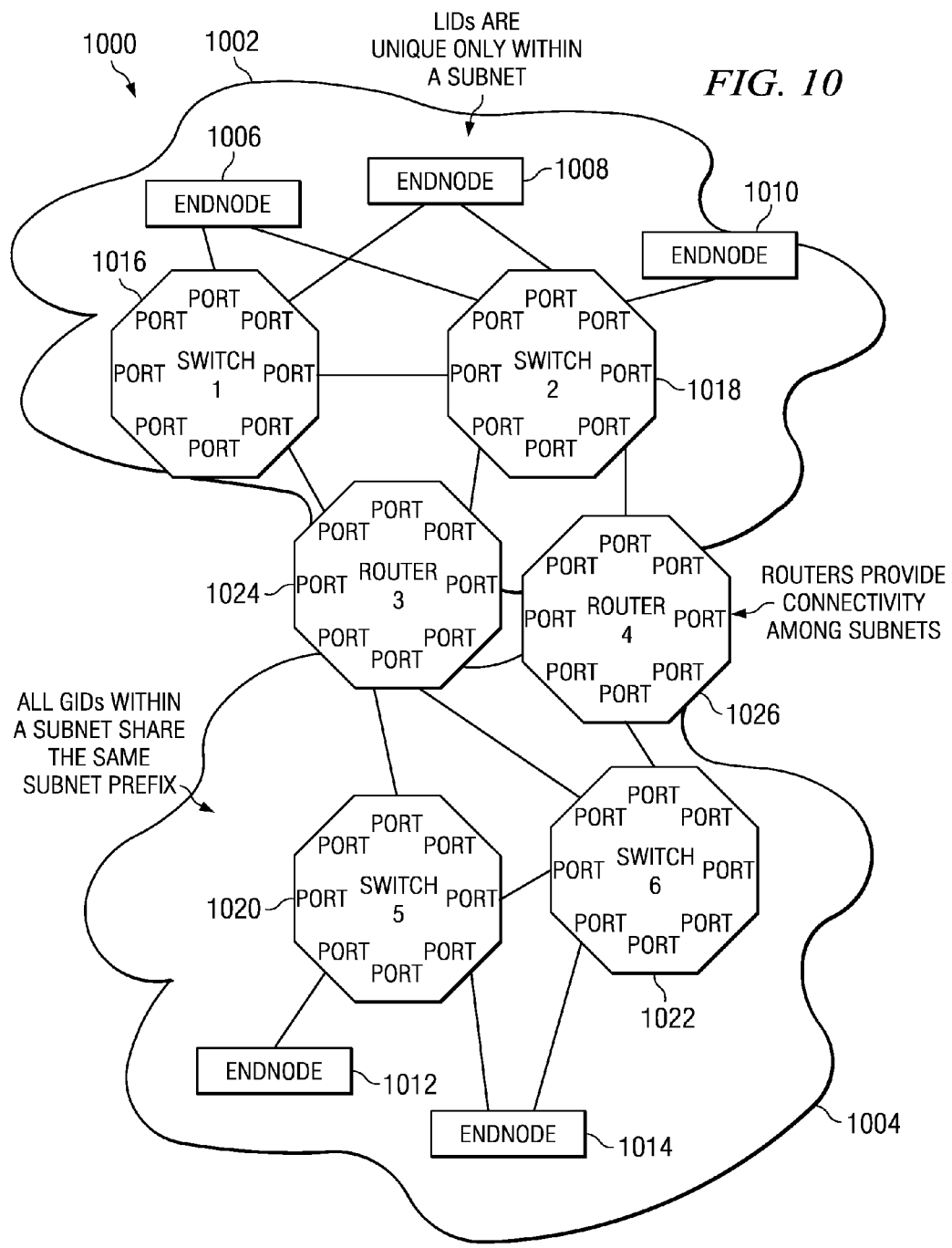
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
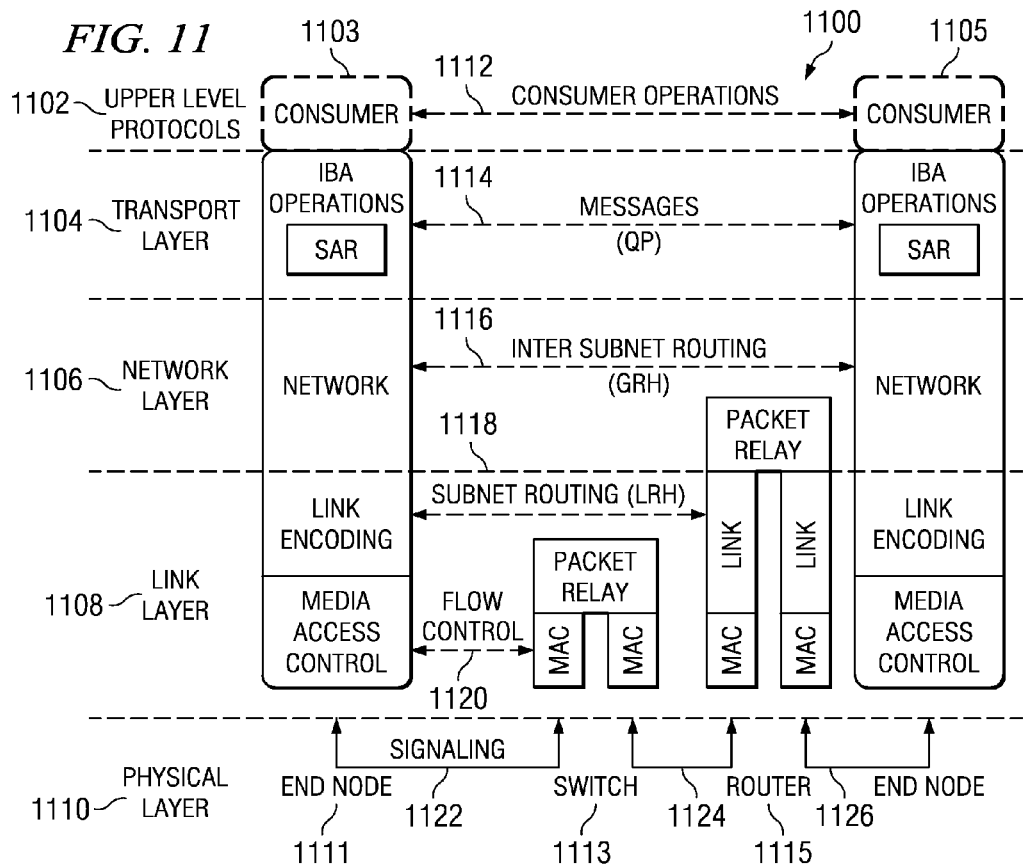
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adaptor endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides three types of transport services as described above which are reliable connection service; reliable datagram service; and unreliable datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

One of the key features in the architecture of the system area network host channel adapters is the ability to provide direct access to application memory space from the host channel adapter without the access requests having to be processed through the operating system. For example, the InfiniBand RDMA engine allows direct read/write access to an application's memory space via the host channel adapter. While this greatly increases the throughput of the endnodes, it may lead to other problems stemming from situations in which direct access to application memory space is not desirable. For example, when data integrity operations are performed to ensure the integrity of data stored in memory in the case of an application or system failure, such direct access to application memory space may lead to the possibility of data corruption.

One such data integrity operation is a checkpoint operation. A checkpoint operation is one in which the application state and memory contents for an application are written to stable storage at particular timepoints, i.e. checkpoints, in order to provide a basis upon which to recreate the state of an application in the event of a failure. In the event of such a failure, the state of the application may be rolled back to the checkpoint and operations occurring after the checkpoint, as logged in an operation log, may be replayed in order to recover the current state of the application.

It can be seen that if access to an application memory space is permitted during such a checkpoint operation, the state of the data in memory may not be accurate in stable storage and data corruption may occur, i.e. the actual state of the application may not be able to be recreated in the event of a failure.

With the InfiniBand RDMA engine, when a checkpoint data integrity operation is performed on an InfiniBand connected system, access to host memory must be protected until the memory pages marked for checkpointing have been written to stable storage. However, with InfiniBand, changes in privileges and physical memory pages accessible by the host channel adapter cannot be made without first tearing down existing connections or halting them, otherwise access to the memory is not race free and may cause connections to fail.

Simply disabling memory access to an RDMA operation in the InfiniBand RDMA engine results in a connection failure. Similarly, causing page fault interrupts to the operating system when access to a protected memory page is attempted may cause connections to timeout while the host channel adapter waits for the interrupt to be resolved. Additionally, messages in the channels must be accounted for in the checkpoint process. RDMA and other operations executing in the host channel adapter of the nodes participating in the checkpoint operation must complete or cooperatively pause. Each of these considerations makes data integrity operations, such as checkpointing, difficult to implement in a system area network host channel adapter configuration. Thus, there is no mechanism currently available in the host channel adapters of a system area network endpoint that permit such data integrity operations to be performed in a protected manner such that data corruption by pending direct memory access operations is avoided.

It has been observed that this type of data corruption problem is not an issue with Ethernet adapters because of the way in which the Ethernet Adapter cooperates with the operating system of the host system. Because access to the application memory space is indirect, i.e. must be performed via the operating system, an intermediary is provided which can serialize the accesses to the application memory space and eliminate the sources of data corruption discussed above.

Figure 12:
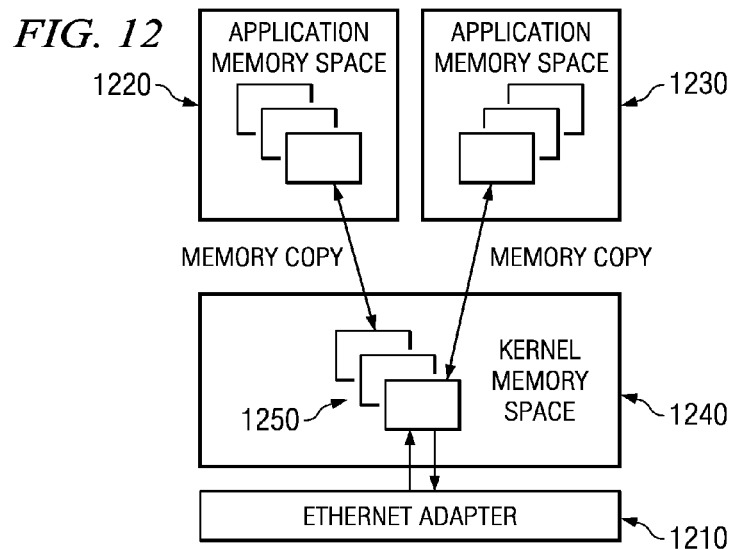
FIG. 12 is an exemplary diagram illustrating a known Ethernet adapter memory access operation.

FIG. 12 is an exemplary diagram illustrating a known Ethernet adapter memory access operation. As shown in FIG. 12, the Ethernet adapter 1210 accesses application memory spaces 1220 and 1230 via the operating system kernel memory space 1240. Thus, for example, in a send operation, the application prepares an adapter buffer pool 1250 in kernel memory space 1240. The application may then transmit data copied from the application memory space 1220 or 1230 to the adapter send memory buffer(s). The Ethernet adapter 1210 picks up data packets from the adapter send memory buffer(s) and transmits it over the network.

Similarly, in a receive operation, the Ethernet adapter 1210 stores received data packets in an adapter receive memory buffer area in the kernel memory space 1240. The application copies the data from the adapter receive memory buffer area in the kernel memory space 1240 to the application memory space 1220 or 1230 so that it may be processed by the application.

Thus, with the Ethernet adapter operation, application memory space 1220, 1230 is not directly accessible by the Ethernet adapter 1210. To the contrary, data must be written into the adapter buffer(s) 1250 in the kernel memory space 1240 before being copied to the application memory space 1220, 1230. Similarly, data from the application memory space 1220, 1230 may not be transmitted by the Ethernet adapter 1210 without first being copied to the adapter buffer (s) 1250 in the kernel memory space 1240. As a result, remote applications are not aware of the local application address space 1220, 1230. A drawback of this approach, however, is that the copying operations required between the application memory space 1220, 1230 and the kernel memory space 1240 decrease the system throughput and add latency.

Figure 13:
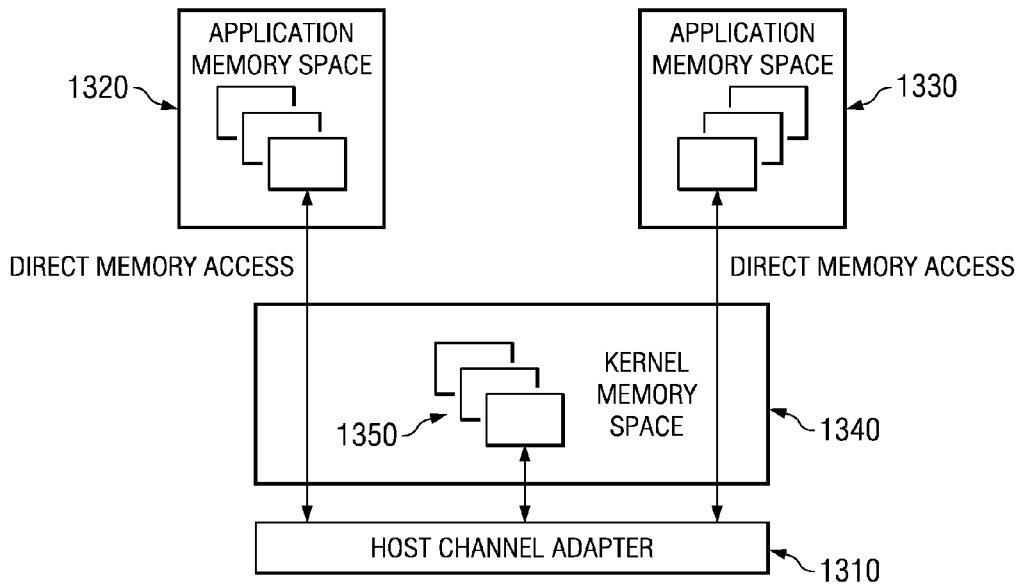
FIG. 13 is an exemplary diagram illustrating a known system area network host channel adapter memory access operation.

In contrast to the Ethernet adapter operation, the host channel adapter of a system area network, such as InfiniBand, provides direct access to application memory space by remote applications. FIG. 13 is an exemplary diagram illustrating a known system area network host channel adapter memory access operation. As shown in FIG. 13, the host system's operating system programs the host channel adapter 1310 with the identification of memory pages that the host channel adapter 1310 is permitted to access directly by way of direct memory access operations. This notification is performed by pinning pages of the system memory in the application memory space 1320, 1330 and setting up the host channel adapter translation tables to reference these pinned memory pages.

Thereafter, the host channel adapter 1310 may autonomously and directly access these memory pages to perform input/output (I/O) work requests (either local or remote). Thus, rather than having to write requests to the operating system kernel memory space 1340, the host channel adapter 1310 may read and write directly to the application memory spaces 1320 and 1330 by way of direct memory access operations. However, host channel adapter 1310 may interact with the operating system by reading and writing directly to pages 1350 in kernel memory space 1340.

As mentioned above, such direct memory access may cause problems during data integrity operations, such as a checkpoint operation, or other operations in which the state of the data in the memory is important to ascertain and maintain. Since the Ethernet adapter does not experience such problems due to the indirect accessing of application memory space, it would be beneficial to provide an Ethernet-like mode of operation in the host channel adapter of a system area network endpoint that may be invoked when such data integrity operations are to be performed. In other words, a mechanism is needed that permits the host channel adapter to pass I/O requests to the operating system, which may properly redirect the I/O requests to a copy of a target memory page, while a protection condition is active on a given set of memory pages so that connections are not placed into an error state or timeout.

The present invention provides such an Ethernet-like mode of operation in a host channel adapter by providing a remote access redirect capability in the host channel adapter. With the present invention, a host channel adapter may be placed in a remote access redirect (RAR) mode of operation with regard to particular channels of the host channel adapter. When in the PAR mode of operation, I/O operations over the channels that are in the FAR mode are converted to receive messages that are redirected from the send-receive queue pairs associated with the application memory space to a send-receive queue pair designated for the operating system, referred to herein as the E queue pair or E-QP. The I/O operations are posted to the receive queue of the E-QP as receive work requests.

The operating system retrieves receive work requests from its E-QP and performs special processing on these requests to avoid data corruption during the data integrity operation. For example, the operating system may perform a "copy-on-write" operation when processing a receive work request from its E-QP. The "copy-on-write" operation causes a copy of the application memory space pages that are targeted by the receive work requests to be generated and redirects the receive work requests to this copy of the application memory space pages rather than to the actual application memory space pages that are currently undergoing the data integrity operation. The operating system may then update the translation tables of the host channel adapter to remap I/O operations targeting these pages of the application memory space to access the copy of the application memory space pages. In this way, I/O operations may continue to be processed for these pages while the correct state of the application memory space at the checkpoint is written to stable storage. Thus, the application may continue to operate while the data integrity operation is performed as a background operation.

The present invention makes use of marker messages to place the host channel adapter into a RAR mode of operation, to place the host channel adapter back into a normal mode of operation, to pause sending/receiving over a particular channel of the host channel adapter, and to resume sending/receiving over the particular channel. These marker messages may be generated and sent to the host channel adapter, and placed in the E-QP associated with the operating system, by the host system itself, another endnode, a subnet manager, or the like. These marker messages are system area network "immediate" messages, which are interpreted by the host channel adapter. The host channel adapter receives these marker messages and interprets them to place the host channel adapter in a RAR mode of operation, place the host channel adapter in a normal mode of operation, pause sending/receiving on a channel, or resume sending/receiving on a channel. The operating system, upon receiving a marker message, generates an acknowledgement message and transmits it back to the sender of the marker message.

In response to receiving a marker message, the host channel adapter interprets the marker message to determine if the marker message is an instruction to pause sending/receiving over the associated channel, resume sending/receiving over the associated channel, place the host channel adapter in a RAR mode, or place the host channel adapter in a normal mode. The pause and resume marker messages are a mechanism by which both endnodes of a channel may agree to place sending/receiving of messages over the channel in a pause state, or remove a pause state, thereby avoiding the timeout problems that are caused by holding host channel adapters in known system area network endnodes. That is, since both endnodes agree to pausing the traffic over a channel, one endnode is not expecting messages from the other endnode and thereby generating a timeout condition.

The RAR mode messages provide a mechanism for placing the host channel adapter of the endnode in a remote access redirect or Ethernet-like mode of operation in which memory accesses to pages of application memory space that are protected during a data integrity operation are redirected to the operating system of the host system for special processing. In this way, the operating system provides a serialization mechanism for controlling access to protected application memory space pages such that the data is not corrupted during the data integrity operation.

As mentioned above, the data integrity operation that may be performed in conjunction with the present invention may be of various different types, one example being the checkpoint operation discussed above. While the preferred embodiments of the present invention will be described in terms of a checkpoint operation, it should be appreciated that the present invention is not limited to such and any operation, in which access to memory pages by a host channel adapter of a system area network should be controlled by software in the host system rather than permitting direct memory access by the host channel adapter, may be used without departing from the spirit and scope of the present invention. With this in mind, the following figures are provided to explain the operation of the present invention in more detail when performing a checkpoint operation in a host channel adapter in accordance with exemplary embodiments of the present invention.

Figure 14:
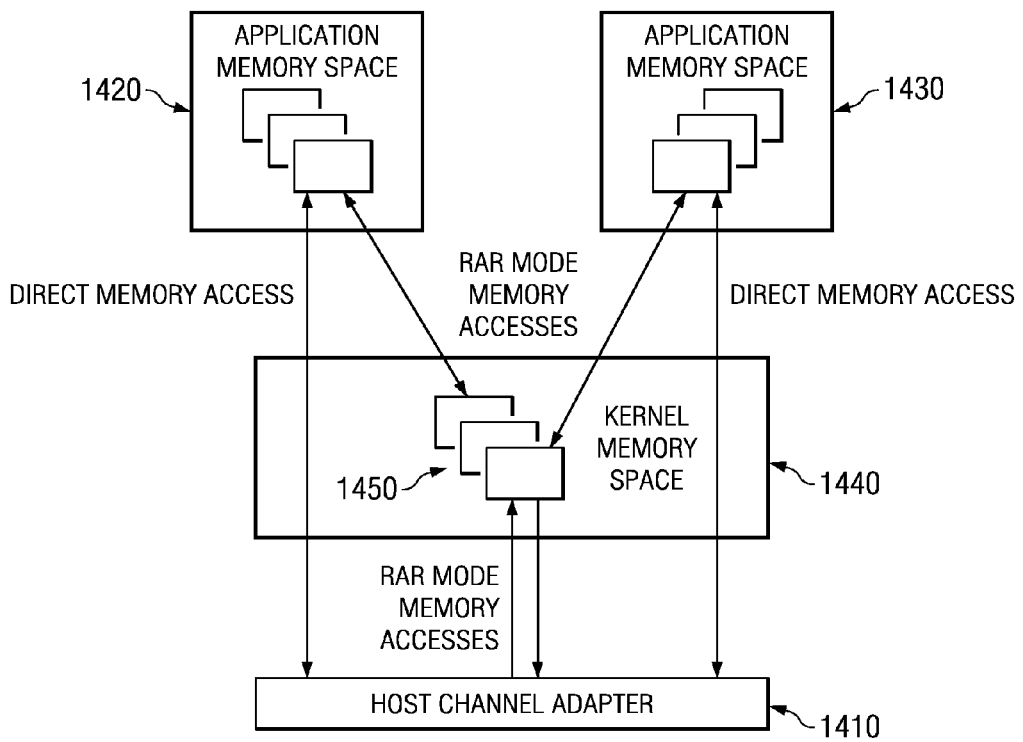
FIG. 14 is an exemplary diagram illustrating a memory access operation in accordance with one exemplary embodiment of the present invention.

FIG. 14 is an exemplary diagram illustrating an interaction between a host channel adapter and application and kernel memory spaces in accordance with one exemplary embodiment of the present invention. As shown in FIG. 14, in a normal mode of operation, similar to that illustrated in FIG. 13, the host channel adapter 1410 may directly access the application memory space 1420, 1430 via direct memory access operations without having such accesses being passed through the operating system. However, in a second mode of operation, i.e. the remote access redirect (RAR) mode of operation, the host channel adapter 1410 must access application memory space 1420, 1430 via the kernel memory space 1440. This is similar to the operation of the Ethernet adapter illustrated in FIG. 12.

Figure 15:
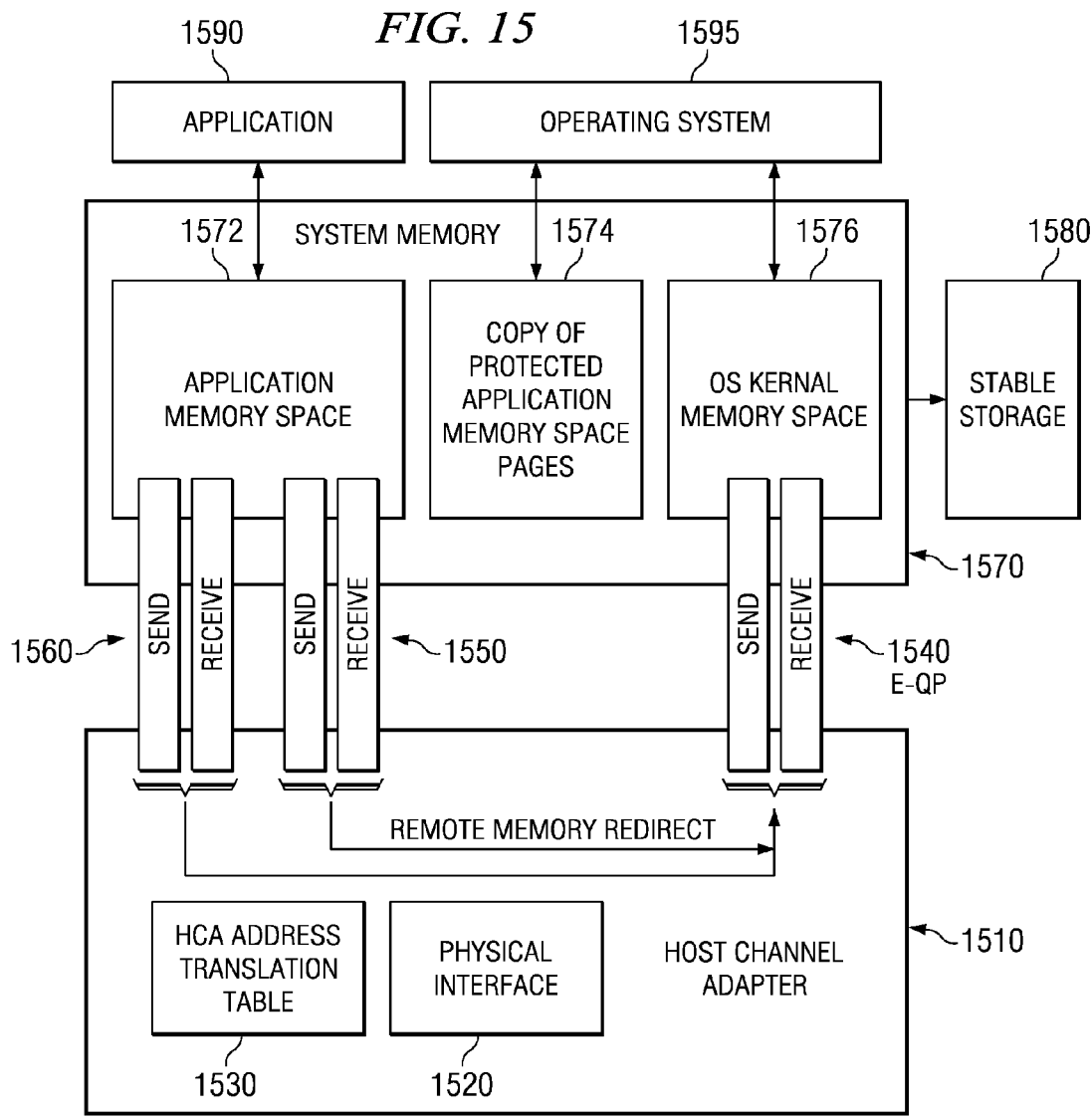
FIG. 15 is an exemplary diagram illustrating the primary operational elements of a system area network end node and their interaction in accordance with one exemplary embodiment of the present invention.

FIG. 15 is an exemplary diagram illustrating the primary operational elements of a system area network end node and their interaction in accordance with one exemplary embodiment of the present invention. As shown in FIG. 15, the host channel adapter 1510 includes a physical interface 1520, a host channel adapter address translation table 1530, queue pairs 1550-1560 associated with channels of communication to one or more application memory spaces 1572 in system memory 1570. There is one queue pair for each channel. Similarly, a separate queue pair, the E-QP 1540, is provided for each channel to the operating system kernel memory space 1576. The E-QP 1540 differs from the queue pairs 1550-1560 in that the E-QP 1540 is not connected or visible to remote queue pairs, work requests on the E-QP are always affiliated with a local queue pair 1550 or 1560, and marker messages are always delivered to the E-QP 1540. The E-QP for the channel is associated with the channel through its association with the queue pair 1550, 1560 for that channel.

As mentioned previously, the host channel adapter 1510 may be placed in either a normal mode of operation or a remote access redirect (RAR) mode of operation using marker messages which are system area network immediate messages interpreted by the host channel adapter. The marker message may be generated, for example, by checkpoint software in the host system, a subnet manager, another endnode, or the like, and sent to the host channel adapter 1510.

The marker message is received in the host channel adapter 1510, either via physical interface 1520 or placed in the send queue of the operating system kernel's queue pair 1540, i.e. the E-QP 1540, by the operating system 1595. The host channel adapter 1510 receives the marker message, interprets the marker message to determine what type of marker message it is, and then takes appropriate action based on the type of marker message. The marker message may have five different types: Pause, Resume, RAR-mode on, RAR-mode off, and None. The "None" marker message is used to pass the marker message to software such that the host channel adapter performs no operations on the marker message, e.g., does not interpret the marker message. The remaining four types of marker messages are described hereafter.

Assuming that the marker message is a RAR-mode on marker message, the host channel adapter 1510 performs the necessary operations to change the mode of operation of the host channel adapter 1510 from a normal mode of operation to a PAR mode of operation. These operations may include the host channel adapter 1510 enabling local PAR-mode and sending a RAR-mode marker message on the associated channel that is being placed in PAR-mode. The host channel adapter 1510 then waits for acknowledgement of the PAR mode marker message and updates its retry and timeout timers for the channel to use RAR-mode values. The responding host channel adapter, i.e. at the other end of the channel, also performs a similar action.

Based on the channel over which the PAR-mode on marker message was received, or the channel otherwise identified in the RAR-mode one marker message, the host channel adapter 1510 identifies those entries in the host channel adapter translation table 1530 corresponding to that channel. These entries are then marked as being protected. As a result, any I/O operations directed toward a portion of application memory space 1572 that is indicated as being protected in the host channel adapter address translation table 1530 will be redirected from their destination queue pair 1550 or 1560 to an E-QP 1540 for the channel that is associated with the I/O operation, e.g., E-QP 1540.

For example, assume that an I/O operation request is received by the host channel adapter 1510 that is destined for the application 1590, and thus application memory space 1572. If the portion of application memory space 1572 that is the target of this I/O operation request is marked as protected in the host channel adapter translation table 1530, then rather than placing a work queue entry for the I/O operation request in the receive queue of queue pair 1560, the host channel adapter 1510 converts the I/O operation request to a RAR request message and posts the RAR request message to the receive queue of the E-QP 1540.

If the operation that is requested is a write I/O operation, the host channel adapter 1510 may then acknowledge the operation as done to the sender of the I/O operation request. If the operation is not a write I/O operation, the host channel adapter 1510 defers responding until the operating system provides a response via the E-QP send queue. As the response times to operations performed by the operating system may be longer than during normal operation of the host channel adapter, marker messages may be sent on the channel to the sender of the I/O operation request to thereby indicate that the channel is operating in PAR mode. Based on the marker messages, the sender of the I/O operation request may program its timeout/retry logic to reflect the operating state of the channel, e.g., increase the elapsed time before a timeout is identified. This avoids an error or timeout condition on the channel while the host channel adapter is operating in RAR mode.

The operating system 1595 reads the RAR request message from the receive queue of the E-QP 1540 and performs the requested action, e.g., memory read, memory write, or atomic operation, and generates a RAR response message which is posted to the E-QP 1540 send side (in the case of a write, since an acknowledgement has already been sent, a RAR response message is not generated). If necessary, the operating system 1595 also performs an update to the host channel adapter translation table 1530 to remap memory pages that have been copied to another portion of system memory 1570, e.g., copy of protected application memory space pages 1574.

In performing the requested action, the operating system may perform any necessary operations to perform the requested action and yet maintain the integrity of the data of the protected application memory space pages. For read operations, the operating system 1595 may read the data from the identified application memory space page 1572, as identified by the host channel adapter address translation table 1530. However, for a write I/O operation, since the data that is stored in the application memory space will be changed by the write I/O operation, a more complex operation may be required.

As mentioned above, one such operation may be a copy-on-write operation in the case of a write I/O request being received that is targeted for a protected application memory space page, Such a copy-on-write operation may involve copying a protected application memory space page to another portion 1574 of system memory 1570 so that the write I/O operation may be performed on the copy of the application memory space page rather than the original application memory space page. The host channel adapter address translation table 1530 may then be updated to point to this copy of the application memory space page rather than the original application memory space page for future I/O operations.

In this way, the application 1590 may continue to read and write to protected portions of application memory space 1572 in system memory 1570 while those portions of memory are protected from alteration.

For example, the application 1590 may continue to write to application memory space 1572 while a checkpoint data integrity operation is being performed by the host system. That is, the operating system 1595 may determine that a checkpoint operation is to be performed with regard to an application 1590. As a result, the operating system 1595 may post a RAR-mode on marker message to the send queue of the E-QP 1540. Of course, multiple RAR-mode on marker messages may be posted to E-QPs associated with the operating system in order to place multiple channels in RAR mode. The host channel adapter then marks the host channel adapter address translation table 1530 entries corresponding to the channels that are placed in RAR mode as being protected. Thereafter, I/O operations targeting these protected application memory space pages are redirected to the operating system 1595 via the E-QPs 1540. Thus, while the operating system 1595 writes protected application memory space pages to stable storage 1580 in order to generate a checkpoint, the application 1590 may continue to access these protected application memory space pages for read, write and atomic I/O operations.

As discussed above, once the operating system completes the necessary operations to perform the action requested in the RAR request message posted to the receive queue of the E-QP 1540, the operating system posts a RAR response message to the send queue side of the E-QP 1540. The host channel adapter 1510 reads the RAR response message from the send queue side of the E-QP 1540 and sends the RAR response message as packets for deferred responses to the sender of the I/O operation request message. Retry messages that are received during this time are dropped.

Thus, the RAR-mode on marker message provides a mechanism for redirecting access requests, i.e. I/O operation request messages, to the operating system for special processing when the access request is directed to a protected portion of application memory space. In this way, the potential for data corruption due to direct memory access via the host channel adapter during data integrity operations is significantly reduced.

The RAR-mode off marker message is used to turn off RAR-mode operation in the host channel adapter 1510. The RAR-mode off marker message causes the host channel adapter to send RAR-mode off marker messages to the other endnode of the channel. Before sending the RAR-mode off marker message on the channel, the host channel adapter 1510 must ensure that all deferred responses have been drained from the E-QP 1540. There may be a race condition between the host channel adapter 1510 and the operating system 1595 in such a situation.

To resolve this race condition, the host channel adapter 1510 traces outstanding RAR-requests on the E-QP 1540 and transitions to RAR-mode off only when the operating system has provided responses to all outstanding RAR requests. When the host channel adapter 1510 transitions to the RAR-mode off state, the host channel adapter sends a RAR-mode off marker message on the channel to the other endnode. The host channel adapter 1510, however, keeps the RAR-mode timer values active until the remote endnode also sends a FAR-mode off marker message (if the remote endnode is the one that sent the FAR-mode on marker message).

The pause marker message is used to request that the host channel adapter 1510 pause normal sending/receiving of messages over a channel. The host channel adapter 1510 of one endnode may receive a pause marker message, such as from an operating system 1595, subnet manager, etc., and initiate a pause operation on the designated channel. The pause operation involves the host channel adapter 1510 sending another pause marker message on the channel that is to be paused, to the other endnode of the channel, i.e. the remote endnode. The host channel adapter 1510 then waits for an acknowledgement on the channel. If a timeout occurs, the pause marker message is resent to the remote endnode.

When the remote endnode returns an acknowledgement of the pause marker message, the host channel adapter 1510 writes the state of the active work to system memory 1570. The work state is the number of bytes sent or received for the active work requests on that channel. This information is sufficient to allow the application 1590 to create new work requests if a rollback of the state of the channel is performed in a recovery operation. Thereafter, a completion status message is sent to the operating system, subnet manager, or other process that requested the pausing of sending/receiving over the channel.

On the remote endnode, upon receiving the pause maker message from the host channel adapter 1510, the remote endnode's host channel adapter stores the state of the active work operations on the channel in a similar manner as is done in the host channel adapter 1510. As a result, both endpoints have a stored state of the active work operations on their respective host channel adapters for the paused channel and are not expecting any messages over the channel. Therefore, no timeout conditions or error conditions will occur on the paused channel.

While paused, the only messages that may be sent or received over the paused channel are marker messages since they do not affect the state of the host channel adapter with respect to suspended or paused operations, e.g., the next packet sequence number is not modified on sending or receiving a marker message. Thus, while paused, a RAR-mode on, RAR-mode off, resume, or none type marker message may be sent/received over the channel.

The pause marker message may be used separately or in conjunction with the RAR-mode on/off marker messages to pause channels handled by the host channel adapter. Thus, for example, a process may pause sending/receiving of messages over a channel prior to or after initiating a RAR-mode on the host channel adapter. In this way, for example, a process may pause the sending/receiving of messages over a channel and initiate a PAR-mode of operation for the host channel adapter in order to perform a checkpoint operation. The messages currently in the host channel adapter may be processed in accordance with the PAR-mode of operation described previously but no additional messages are permitted to be sent/received over the channel while the channel is paused. Once the checkpoint operation is complete, the RAR-mode may be turned off such that normal operation of the host channel adapter may resume. Thereafter, the pause state of the channel may be turned off so as to resume sending/receiving of messages over the channel.

The resume marker message is used to instruct the host channel adapter to generate a resume marker message on the channel and send it to the other endnode on the channel. The host channel adapter 1510 may then wait for an acknowledgement message to the resume marker message. Once the acknowledgement message is received, timeout and retry timers are reset for operations that are being resumed and normal sending/receiving of messages over the channel is enabled. Similarly, on the other endnode, upon receiving the resume marker message, the host channel adapter of the other endnode resets its timeout and retry timers for operations being resumed and then resumes normal sending/receiving of messages over the channel.

Thus, the present invention provides mechanisms for pausing and resuming sending/receiving of messages over a channel. The present invention further provides mechanisms for placing host channel adapters into a remote access redirect mode of operation in which software, e.g., the operating system, controls access to application memory space rather than permitting the host channel adapter to directly access the application memory space. Essentially, the present invention provides mechanisms for placing the host channel adapter in a degraded mode of send/receive operation.

It should be noted that while the above embodiments of the present invention have been described in terms of redirecting I/O operation request messages to the operating system, the present invention is not limited to such. Rather, the redirection performed by the present invention may be to another process or application other than the operating system. This process or application must be capable of handling I/O operation requests to protected portions of application memory space. For example, a dedicated process or application may be provided in each host system for handling I/O operation requests to protected portions of application memory space during checkpoint operations.

Figure 16:
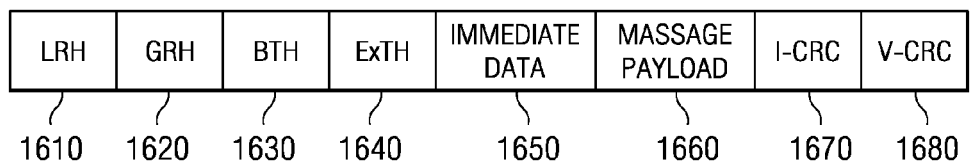
FIG. 16 is an exemplary diagram of a marker message in accordance with on exemplary embodiment of the present invention.

FIG. 16 is an exemplary diagram of a marker message in accordance with on exemplary embodiment of the present invention. As shown in FIG. 16, a marker message 1600 includes a local route header (LRH) 1610, a global route header (GRH) 1620, a base transport header (BTH) 1630, an extended transport header (ExTH) 1640, immediate data 1650, a message payload 1660, a invariant cyclic redundancy check value (I-CRC) 1670, and a variant cyclic redundancy check value (V-CRC) 1680. It can be seen, such as by comparing FIG. 16 to FIG. 7A, that the marker message takes the same format as other system area network data packets where LRH 1610 and GRH 1620 correspond to routing header 716, BTH 1630 and ExTH 1640 correspond to transport header 718, immediate data 1650 and message payload 1660 correspond to packet payload 710, and I-CRC 1670 and V-CRC 1680 correspond to CRC 714.

The immediate data 1650, in one exemplary embodiment, is a four byte (32 bit) field that identifies one of the various marker message types to be interpreted by the host channel adapter. Thus, the immediate data 1650 informs the host channel adapter as to whether the marker message is a RAR-mode on, RAR-mode off, pause, resume or none type marker message. The host channel adapter identifies that the message is a marker message, and the type of marker message, by comparing the immediate data field value with a value programmed in the channel queue pair context loaded in the host channel adapter. For each marker message type, the host channel adapter is programmed with one or more actions that are to be performed, such as those actions/operations discussed above with regard to each marker message type. These actions are initiated based on the results of the comparison of the immediate data 1650 to the channel queue pair context information loaded in the host channel adapter.

The message payload 1660 may be an empty payload or may include additional information that may be processed by the host channel adapter to perform the necessary actions to place the host channel adapter in RAR-mode, turn PAR-mode off, pause sending/receiving over a designated channel, and resume sending/receiving over a designated channel.

FIGS. 17-22 are flowcharts that illustrate various operations according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 17:
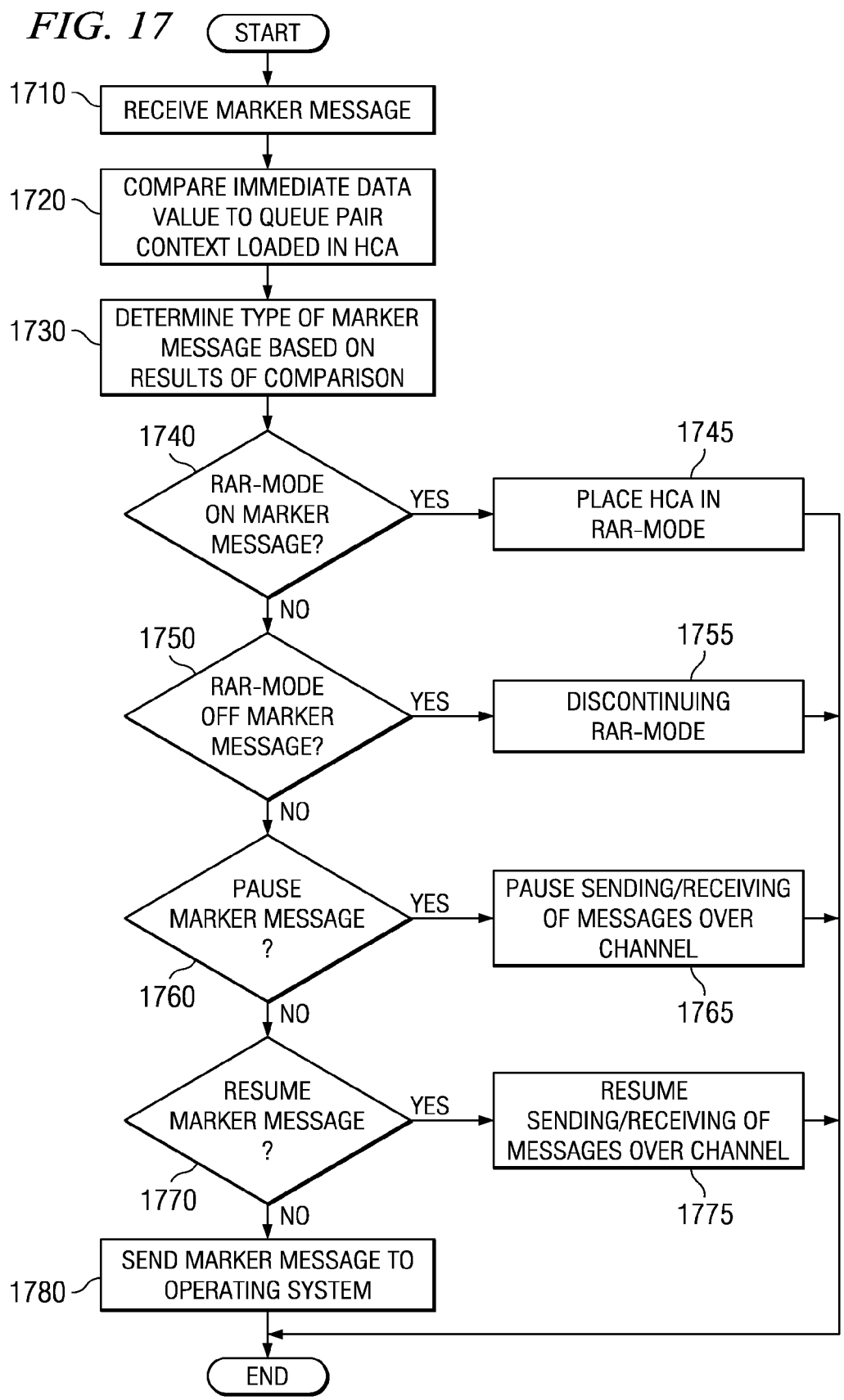
FIG. 17 is a flowchart outlining an exemplary operation of a host channel adapter when processing a marker message, in accordance with one exemplary embodiment of the present invention.

FIG. 17 is a flowchart outlining an exemplary operation of a host channel adapter when processing a marker message, in accordance with one exemplary embodiment of the present invention. As shown in FIG. 17, the operation starts by receiving a marker message (step 1710). The immediate data value in the immediate data field of the marker message is compared to values stored in the queue pair context loaded in the host channel adapter (step 1720). Based on this comparison, the type of marker message may be determined and appropriate actions by the host channel adapter are performed (step 1730).

A determination is made as to whether the marker message is a RAR-mode on marker message (step 1740). If so, the host channel adapter is placed in RAR-mode (step 1745). If the marker message is not a RAR-mode on marker message, a determination is made as to whether the marker message is a RAR-mode off marker message (step 1750). If so, the RAR-mode of operation in the host channel adapter is discontinued (step 1755).

If the marker message is not a PAR-mode on or RAR-mode off marker message, a determination is made as to whether the marker message is a pause marker message (step 1760). If so, sending/receiving or messages over the associated channel is paused (step 1765). If the marker message is not a pause marker message, a determination is made as to whether the marker message is a resume marker message (step 1770). If so, then sending/receiving of messages over the associated channel is resumed (step 1775). If the marker message is neither a PAR-mode on, RAR-mode off, pause or resume message, then the marker message is a "none" marker message and is sent to the operating system (step 1780). The operation then terminates.

FIG. 18 is a flowchart outlining an exemplary operation of a host channel adapter when initiating a RAR-mode of operation in response to receiving a RAR-mode on marker message, in accordance with one exemplary embodiment of the present invention. The operation in FIG. 18 corresponds to the operations that are performed, for example, in response to step 1745 of FIG. 17.

As shown in FIG. 18, the operation starts by receiving a PAR-mode on marker message (step 1810). In response, a RAR-mode on marker message is sent on the associated channel to the remote endnode of the channel (step 1820). The host channel adapter then waits for an acknowledgement of the RAR-mode on marker message (step 1830). A determination is then made as to whether an acknowledgement has been received (step 1840). If not, the operation returns to step 1830 and continues to wait for the acknowledgement (unless a timeout condition has occurred, at which the marker message may be sent or an error indicated).

If an acknowledgement has been received, the timeout and retry timers of the host channel adapter for the designated channel are set to PAR-mode values rather than their normal values (step 1850). As mentioned above, since, in PAR mode, memory access requests may be handled by software rather than the hardware of the host channel adapter, these timeout and retry timers may be increased to allow additional time to process the access requests.

In addition, those memory pages that are associated with the channel that is to be placed in RAR mode are identified and marked in the host channel adapter translation table as being protected (step 1860). The operation then terminates.

Figure 19:
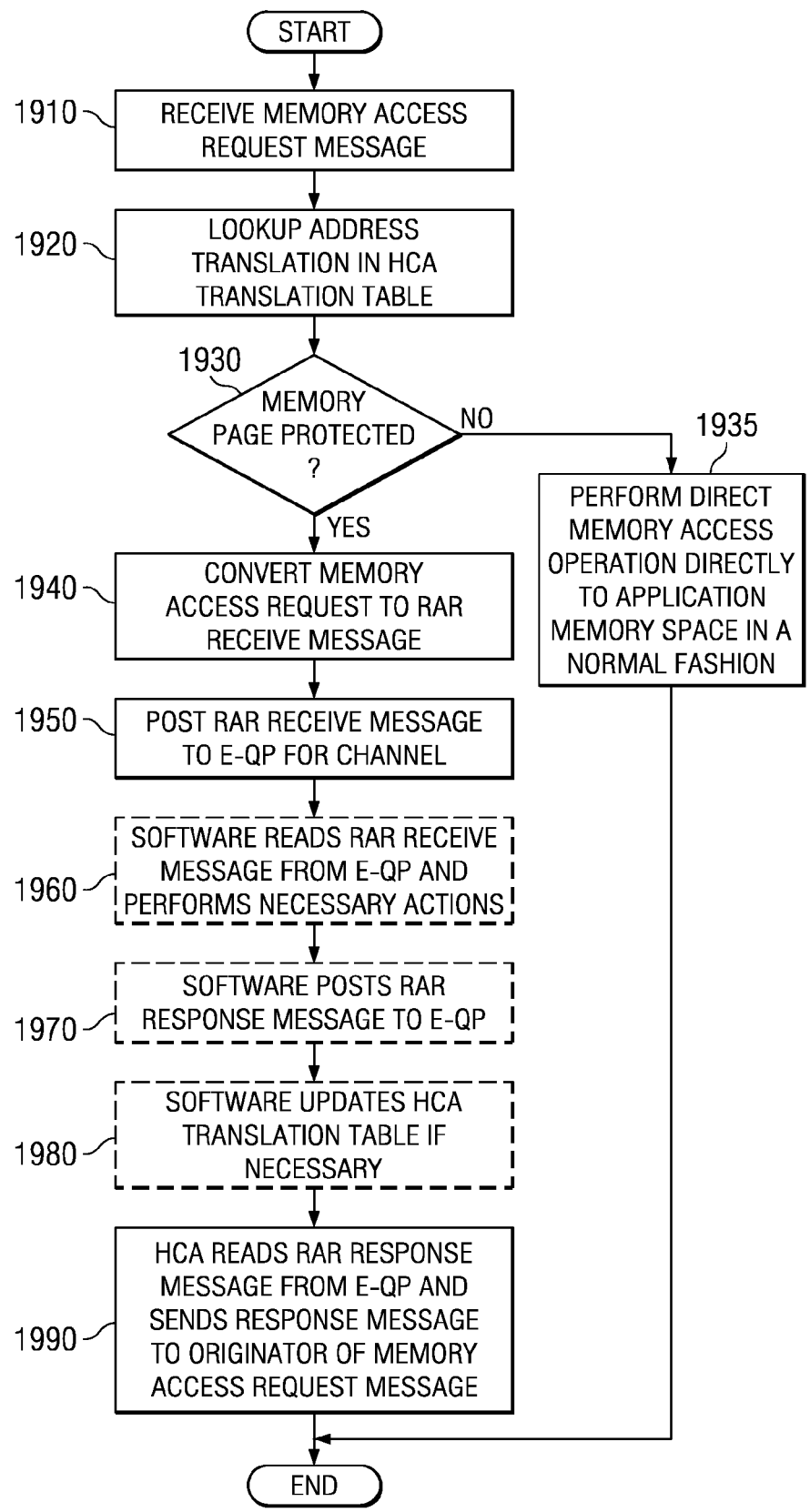
FIG. 19 is a flowchart outlining an exemplary operation of a host channel adapter when processing a memory access message while in a remote access redirect mode of operation, in accordance with one exemplary embodiment of the present invention.

FIG. 19 is a flowchart outlining an exemplary operation of a host channel adapter when processing a memory access message while in a remote access redirect mode of operation, in accordance with one exemplary embodiment of the present invention. As shown in FIG. 19, the operation starts by receiving a memory access request message (step 1910). An address translation lookup is performed using the host channel adapter translation table (step 1920). A determination is made as to whether the memory page that is targeted by the memory access request is protected (step 1930). If not, then a normal direct memory access operation may be performed by the host channel adapter (step 1935) and the operation terminates. If the memory page is protected, the memory access request is converted to a RAR receive message (step 1940) and posted to the E-Qp for the channel (step 1950).

The following steps 1960-1980 are actually performed by the software in the host system but are provided in this flowchart and description for completeness of understanding of the operation of the host channel adapter. As shown, the software, e.g., the operating system, reads the RAR receive message from the E-QP and performs the necessary actions to satisfy the memory access request (step 1960). As mentioned above, these actions may take many forms and may include, for example, a copy-on-write operation.

Thereafter, the software posts a RAR response message to the E-QP indicating completion of the memory access request (step 1970). If necessary, such as when a copy-on-write operation is performed by the software, the host channel adapter translation table may be updated by the software (step 1980).

The host channel adapter reads the RAR response message from the E-Qp and sends a response message to the originator of the memory access request message to indicate that the requested action has been completed (step 1990). The operation then terminates.

Figure 20:
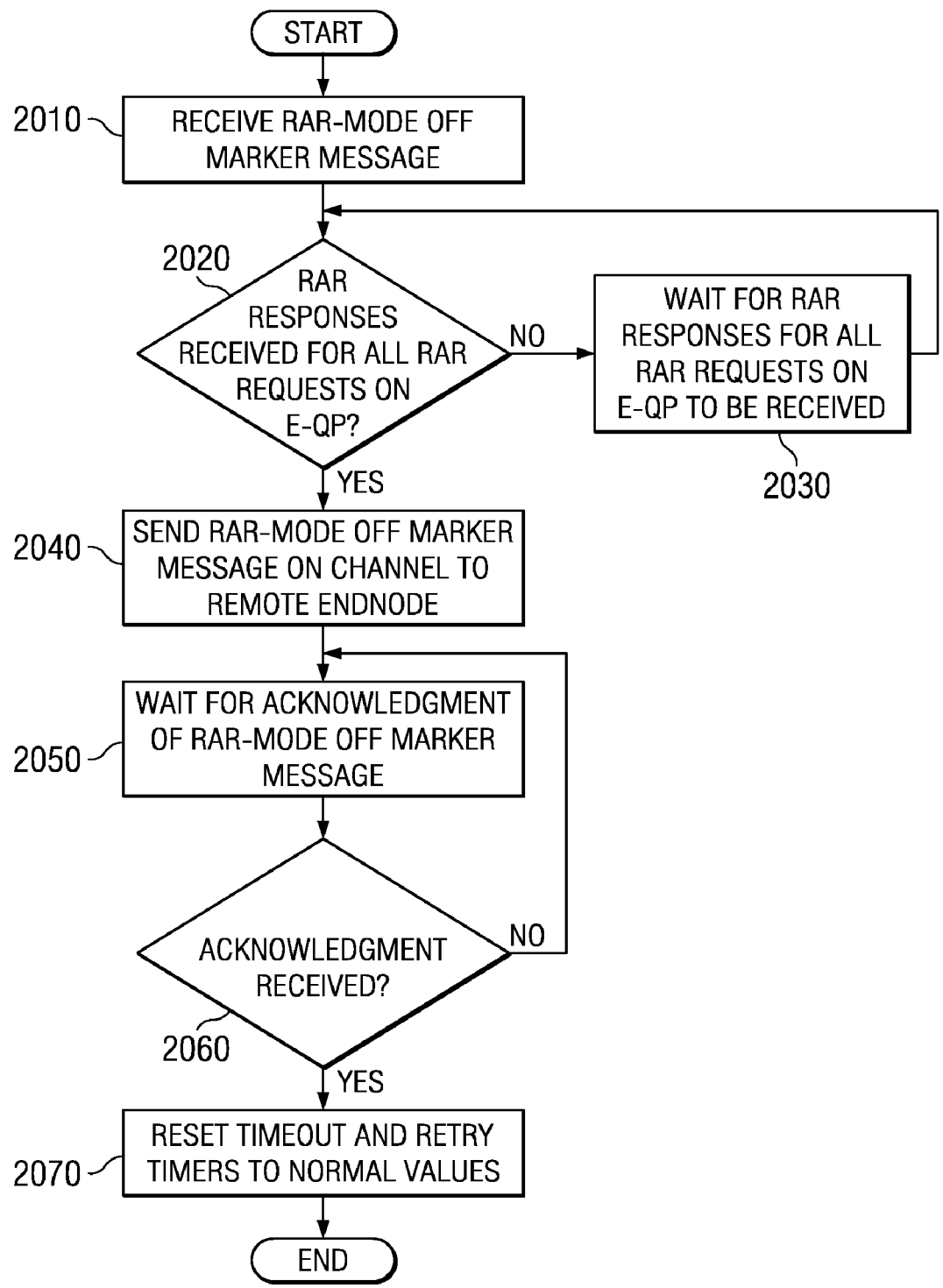
FIG. 20 is a flowchart outlining an exemplary operation of a host channel adapter when exiting a remote access redirect mode of operation, in accordance with one exemplary embodiment of the present invention.

FIG. 20 is a flowchart outlining an exemplary operation of a host channel adapter when exiting a remote access redirect mode of operation, in accordance with one exemplary embodiment of the present invention. The operation outlined in FIG. 20 corresponds, for example, to the operation that is performed in response to step 1755 of FIG. 17.

As shown in FIG. 20, the operation starts by receiving a RAR-mode off marker message (step 2010). A determination is made as to whether RAR responses have been received for all RAR requests in the E-QP for the channel (step 2020). If not, the host channel adapter waits for all RAR responses to be received (step 2030) and returns to step 2020.

If all RAR responses have been received, a RAR-mode off marker message is sent on the channel to the remote endnode (step 2030). The host channel adapter then waits for an acknowledgement to this RAR-mode off marker message (step 2040). A determination is made as to whether an acknowledgement has been received (step 2050) and if not, the host channel adapter returns to step 2040 and continues to wait for the acknowledgement (unless a timeout condition occurs, at which time the marker message may be resent or an error indicated).

Once an acknowledgement of the PAR-mode off marker message is received, the timeout and retry timers associated with the channel are rest to their normal values (step 2060). The operation then terminates.

Figure 21:
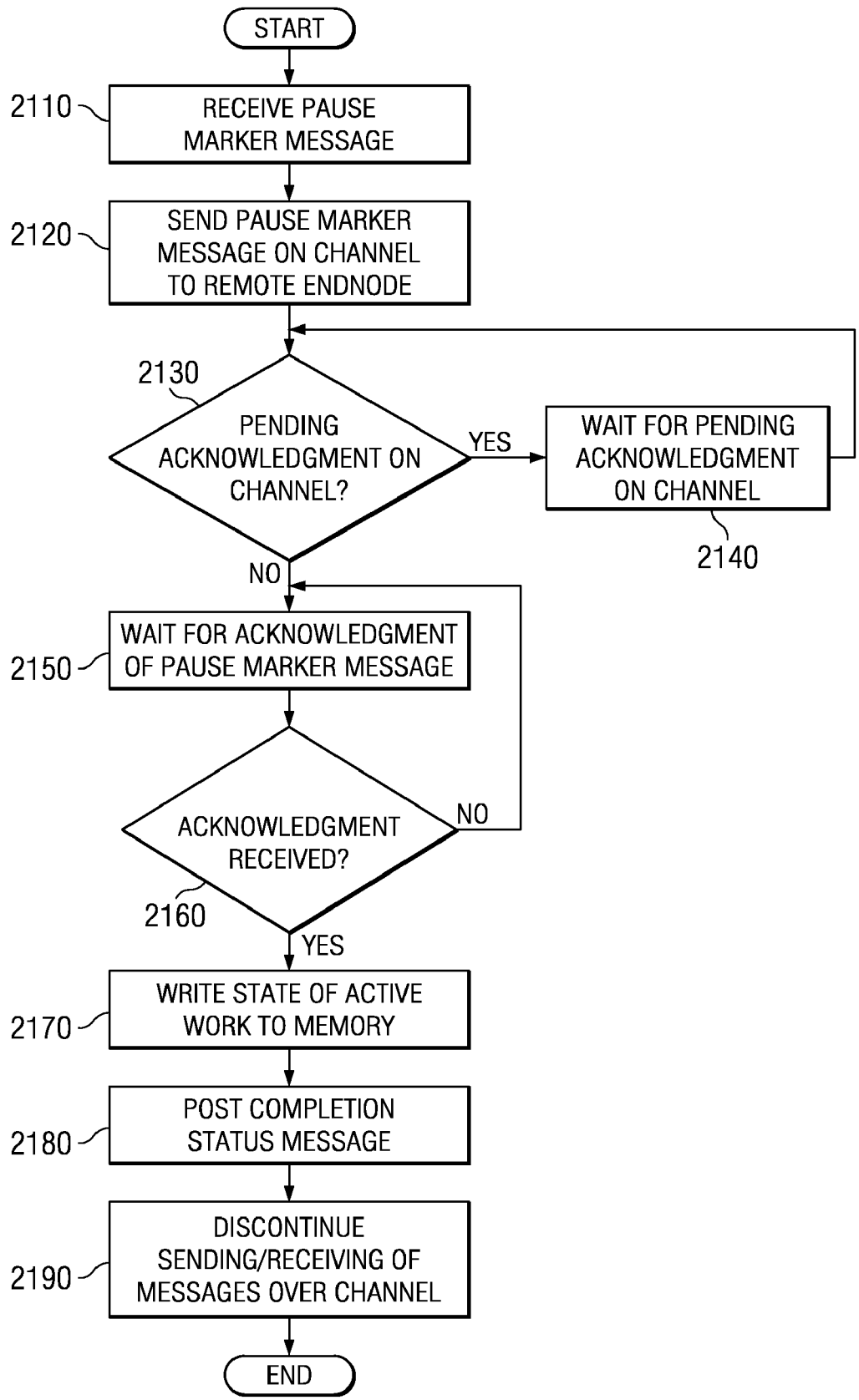
FIG. 21 is a flowchart outlining an exemplary operation of a host channel adapter when pausing sending/receiving of messages over a channel in accordance with one exemplary embodiment of the present invention.

FIG. 21 is a flowchart outlining an exemplary operation of a host channel adapter when pausing sending/receiving of messages over a channel in accordance with one exemplary embodiment of the present invention. The operation outlined in FIG. 21 corresponds, for example, with the operation performed in a response to step 1765 in FIG. 17.

As shown in FIG. 21, the operation starts by receiving a pause marker message (step 2110). In response, the host channel adapter sends a pause marker message on the associated channel to the remote endnode (step 2120. A determination is then made as to whether there are any pending acknowledgments on the channel (step 2130). If so, then the host channel adapter waits for the pending acknowledgements on the channel (step 2140).

If there are no pending acknowledgements on the channel, then the host channel adapter waits for acknowledgement of the pause marker message (step 2150). A determination is made as to whether the pause marker message is acknowledged (step 2160) and if not, the operation returns to step 2150 (unless a timeout condition occurs, at which time the pause marker message may be resent or an error indicated).

Once an acknowledgement of the pause marker message is received, the state of active work on the channel is written to memory (step 2170). A completion status message is then posted to originator of the pause marker message (step 2180) and sending/receiving of messages over the channel is discontinued (step 2190). The operation then terminates.

FIG. 22 is a flowchart outlining an exemplary operation of a host channel adapter when resuming sending/receiving of messages over a channel in accordance with one exemplary embodiment of the present invention. The operation outlined in FIG. 22 corresponds, for example, with the operation performed in a response to step 1775 in FIG. 17.

As shown in FIG. 22, the operation starts by receiving a resume marker message (step 2210). In response, the host channel adapter sends a resume marker message over the channel to the remote endnode (step 2220). The host channel adapter then waits for an acknowledgement of the resume marker message (step 2230). A determination is made as to whether an acknowledgement is received (step 2240) and if not, the operation returns to step 2230 (unless a timeout condition occurs, at which time the resume marker message may be resent or an error indicated).

Once an acknowledgement is received, the timers for operations that are being resumed are reset (step 2250), and sending/receiving of messages over the channel is resumed (step 2260). The operation then terminates.

Thus, the present invention provides a mechanism by which a host channel adapter may modify its normal operation to be in a degraded send/receive operational state. This degraded send/receive operational state may be a pausing of sending/receiving of messages over a channel, a remote access redirect mode of operation, or a combination of these states. One possible application of the mechanisms of the present invention is to data integrity operations, such as a checkpoint operation. In this way, data corruption is avoided during such data integrity operations since memory access are serialized through software running in the host system rather than permitting direct memory access by the host channel adapter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product, in a hardware computer readable medium, for modifying the operation of a host channel adapter in a system area network endnode, the computer program product comprising:

instructions for sending a remote access redirect mode enable marker message to the host channel adapter, wherein the remote access redirect mode enable marker message is an immediate marker message that is interpreted by the host channel adapter, wherein the host channel adapter remains in a remote access redirect mode of operation until a remote access redirect mode disable marker message is received;

instructions, responsive to a receipt of the marker message, for placing the host channel adapter in a remote access redirect mode of operation, wherein the remote access redirect mode of operation converts memory access messages into receive messages, and wherein the remote access redirect mode of operation further causes access requests to protected portions of system memory to be redirected to software running in a host system, wherein the access requests are redirected to software running in the host system by converting the access requests to receive work requests that are posted to a queue pair associated with the software, and wherein the queue pair associated with the software is a different queue pair than a queue pair associated with an application with which the channel communicates;

instructions, responsive to receiving an access request to a protected portion of an application memory space, for performing a copy-on-write remap of the protected portion of the application memory space; and instructions, responsive to performing the copy-on-write remap, for updating a translation table in the host channel adapter to redirect access requests to the protected portion of the application memory space to an operating system kernel memory space.

2. The computer program product of claim 1, further comprising:
instructions for performing a data integrity operation on the protected portion of the application memory space.

3. The computer program product of claim 2, wherein the data integrity operation is a checkpoint operation.

4. The computer program product of claim 2, further comprising:
instructions for sending a pause sending/receiving marker message to the host channel adapter, wherein the host channel adapter is not permitted to send or receive additional messages over a channel associated with the application memory space during the data integrity operation.

5. The computer program product of claim 4, wherein the host channel adapter pauses sending/receiving of messages over the channel until a resume sending/receiving marker message associated with the channel is received at the host channel adapter.

6. The computer program product of claim 2, further comprising:
instructions for sending a remote access redirect mode disable marker message to the host channel adapter upon completion of the data integrity operation.

7. The computer program product of claim 1, wherein the instructions for performing a copy-on-write remap includes copying the protected portion of the application memory space to a copied portion in system memory.

8. The computer program product of claim 7, further comprising:
receiving a write operation from the host channel adapter; and
performing the write operation on the copied portion in system memory.

9. A computer program product, in a hardware computer readable medium, for modifying the operation of a host channel adapter in a system area network endnode, the computer program product comprising:
instructions for sending a remote access redirect mode enable marker message to the host channel adapter, wherein the remote access redirect mode enable marker message is an immediate marker message that is interpreted by the host channel adapter;

instructions, responsive to a receipt of the marker message, for placing the host channel adapter in a remote access redirect mode of operation that causes access requests to protected portions of system memory to be redirected to software running in a host system by converting the access requests to receive work requests that are posted to a queue pair associated with the software, and wherein the queue pair associated with the software is a different queue pair than a queue pair associated with an application with which the channel communicates;

instructions, responsive to receiving an access request to a protected portion of an application memory space, for performing a copy-on-write remap of the protected portion of the application memory space; and instructions, responsive to performing the copy-on-write remap, for updating a translation table in the host channel adapter to redirect access requests to the protected portion of the application memory space to an operating system kernel memory space.

10. The computer program product of claim 9, further comprising:
instructions for performing a data integrity operation on the protected portion of the application memory space.

11. The computer program product of claim 10, wherein the data integrity operation is a checkpoint operation.

12. The computer program product of claim 10, further comprising:
instructions for sending a pause sending/receiving marker message to the host channel adapter, wherein the host channel adapter is not permitted to send or receive additional messages over a channel associated with the application memory space during the data integrity operation.

13. The computer program product of claim 12, wherein the host channel adapter pauses sending/receiving of messages over the channel until a resume sending/receiving marker message associated with the channel is received at the host channel adapter.

14. The computer program product of claim 10, further comprising:
instructions for sending a remote access redirect mode disable marker message to the host channel adapter upon completion of the data integrity operation.

15. The computer program product of claim 9, wherein the instructions for performing a copy-on-write remap includes copying the protected portion of the application memory space to a copied portion in system memory.

16. The computer program product of claim 15, further comprising:
receiving a write operation from the host channel adapter; and
performing the write operation on the copied portion in system memory.

* * * * *